(12) United States Patent
Tanner

(10) Patent No.: US 7,216,397 B1
(45) Date of Patent: May 15, 2007

(54) COLLECTION TANK AND ASSOCIATED CLEANING SYSTEM

(76) Inventor: Paul Tanner, 105 Country Side Dr., Byhalia, MS (US) 38611

( * ) Notice: Subject to any disclaimer, the term of this patent is extended or adjusted under 35 U.S.C. 154(b) by 383 days.

(21) Appl. No.: 10/640,457

(22) Filed: Aug. 13, 2003

(51) Int. Cl.
*A47L 11/30* (2006.01)
*E01H 1/08* (2006.01)

(52) U.S. Cl. ........................... 15/320; 15/340.1

(58) Field of Classification Search .............. 15/320, 15/321, 340.1, 340.2, 340.3, 340.4; 210/241, 210/521, 534, 539
See application file for complete search history.

(56) References Cited

U.S. PATENT DOCUMENTS

| | | | |
|---|---|---|---|
| 1,369,118 A * | 2/1921 | McDougall et al. | 15/356 |
| 1,803,011 A * | 4/1931 | Fuqua | 210/205 |
| 2,272,912 A * | 2/1942 | Heinkel | 210/539 |
| 2,284,737 A * | 6/1942 | Hirshstein | 210/539 |
| 3,011,206 A * | 12/1961 | Breither | 15/320 |
| 4,336,627 A | 6/1982 | Bascus | |
| 4,475,264 A | 10/1984 | Schulz | |
| 4,991,254 A | 2/1991 | Roden et al. | |
| 5,165,139 A | 11/1992 | Oxman | |
| 5,287,589 A | 2/1994 | Hughes | |
| 5,469,598 A | 11/1995 | Sales | |
| 5,606,768 A | 3/1997 | Sundberg | |
| 5,657,509 A * | 8/1997 | Trautloff et al. | 15/321 |
| 5,979,012 A | 11/1999 | Fritz | |
| 6,182,328 B1 | 2/2001 | Roden | |
| 6,530,117 B2 * | 3/2003 | Peterson | 15/353 |
| 6,645,387 B2 * | 11/2003 | Naski et al. | 210/744 |
| 2002/0013975 A1 * | 2/2002 | Fulghum | 15/320 |

FOREIGN PATENT DOCUMENTS

EP 0 951 858 * 10/1999

* cited by examiner

*Primary Examiner*—Terrence R. Till
(74) *Attorney, Agent, or Firm*—Wyatt, Tarrant & Combs, LLP (57) ABSTRACT

The present invention is directed to a cleaning system (e.g., carpet cleaning system) that includes a collection tank (also referred to in the art as a waste tank, waste water tank, recovery tank, or the like) that at least generally tapers toward a bottom end of the same. Accordingly, at least one wall of the collection tank may be characterized as being at least generally sloped, angled, and/or slanted. This tapering of the collection tank may be oriented at least generally toward a release valve associated with the collection tank. In addition to the collection tank, the cleaning system may include a fluid supply tank that, at least in one embodiment, generally tapers toward a top end of the same. Moreover, the tapering of this fluid supply tank may be said to be oriented at least generally toward a filling port associated with the fluid supply tank.

15 Claims, 6 Drawing Sheets

COLLECTION TANK AND ASSOCIATED CLEANING SYSTEM

CROSS-REFERENCE TO RELATED APPLICATION

None

STATEMENT REGARDING FEDERALLY SPONSORED RESEARCH OR DEVELOPMENT

Not Applicable

BACKGROUND OF THE INVENTION

1. Field of the Invention

The present invention generally relates to cleaning systems and, more particularly, to a recovery tank assembly for a mobile cleaning (or shampooing) system.

2. General Background of the Invention

Numerous cleaning systems are available today for cleaning and/or shampooing of carpets, upholstery, and the like. A typical system may include a mechanism for heating liquid (e.g., cleaning solution and/or water) that may be conveyed under pressure to and sprayed onto carpet or upholstery to be cleaned. In addition, some type of vacuum device is generally provided for effecting vacuum removal of the liquid from the carpet or upholstery along with the soil. Typically, these cleaning systems, which usually include internal combustion engines for driving the cleaning liquid and vacuum pump(s), are generally mounted in or carried by a motor vehicle such as a panel truck or van (e.g., for ease of transport).

An exemplary conventional cleaning system provides a vehicle-mounted system that includes a high pressure pump that draws liquid from a fresh liquid supply, may pass it through a heat exchanger to heat the same, and then passes it through a high pressure hose to a hand-held cleaning wand to enable high pressure water to be applied to the object to be cleaned. Moreover, a vacuum blower capable of generating a strong vacuum is typically connected to a recovery tank from which air is extracted to produce the vacuum. A vacuum hose is generally also connected to this recovery tank and the cleaning wand. Accordingly, the system can suck the liquid along with the soil from the object and pass same into the recovery tank (also referred to in the art as a "waste tank" or "waste recovery tank").

Figure 1:
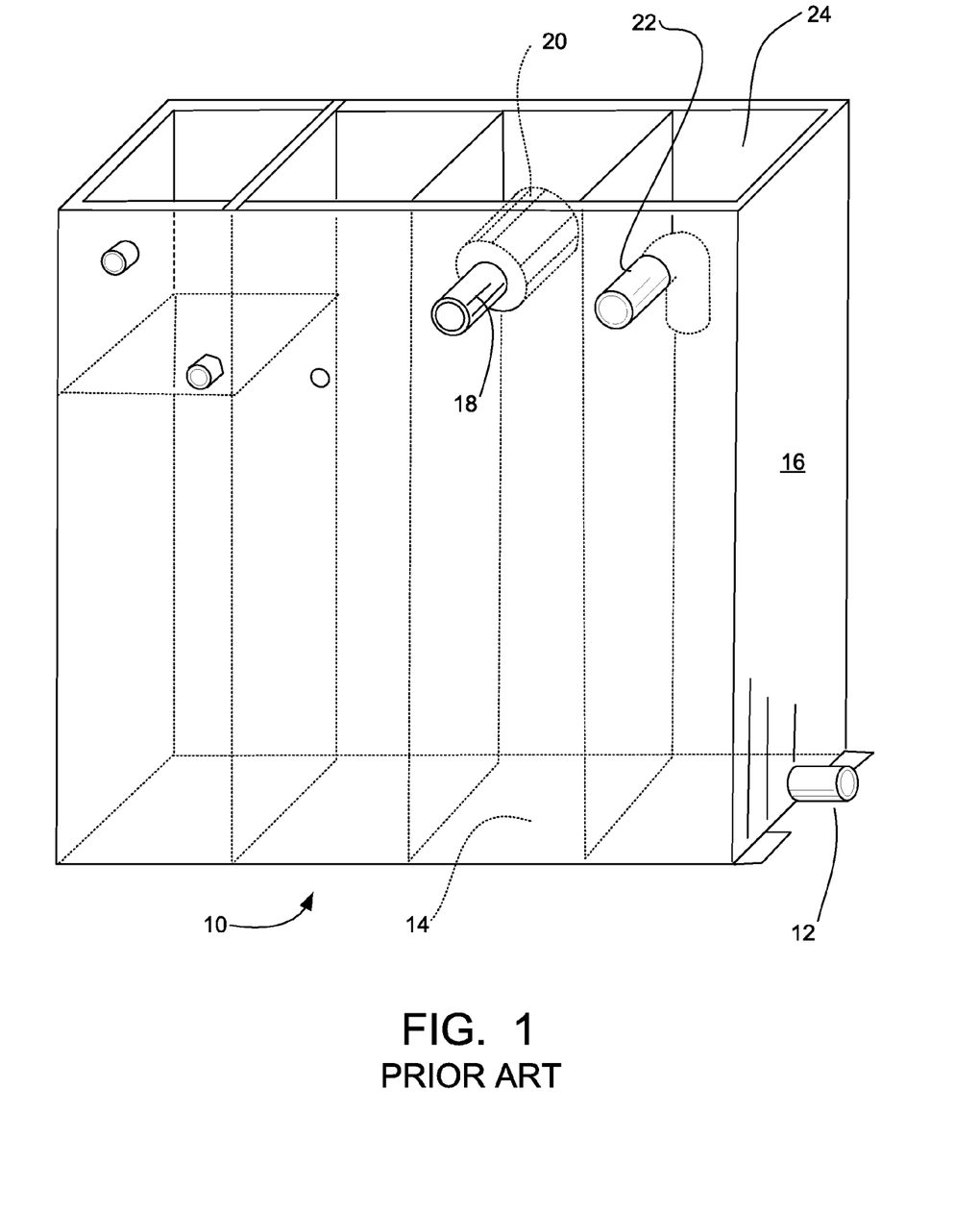
FIG. 1 is a perspective view of a prior art waste recovery tank.

A conventional recovery tank 10 is illustrated in FIG. 1. This recovery tank 10, as is overwhelmingly typical of conventional recovery tanks, is box-shaped or rectangular in cross section. An outlet pipe (and typically a corresponding valve) 12 can generally be found at or near a junction of a bottom wall 14 and a side wall 16 of the tank 10. Further, a vacuum air hose connection 18 generally opens into a portion (generally the topmost) of the tank 10, and a filter 20 (e.g., a sleeve of a porous synthetic material) is generally employed to keep lint and the like from being returned to a vacuum pump (not shown) interconnected with the vacuum air hose connection 18. Yet further, a vacuum suction line (cleaning) connection 22 extends into the tank 10 (generally at or toward a top or upper portion 24). The fluid (water/cleaning solution), which has been disposed on the carpet, and dirt or the like are brought into the recovery tank during the typical vacuuming operation using a wand (not shown) over the carpet to be cleaned.

Conventional recovery tanks (such as the recovery tank 10) have been laden with numerous shortcomings. For instance, these recovery tanks have been shown to exhibit insufficient filtering capacity. Moreover, significant quantities of dirt, lint, and the like tend to settle and deposit on the large flat surface area of the bottom wall 14 of the recovery tank 10. This dirt/lint tends to build up and typically fails to be sufficiently extracted from the tank 10 upon opening of the outlet pipe 12, thus resulting in increased wear (e.g., propensity for rusting and/or corrosion), and even plugging of the outlet pipe 12.

SUMMARY OF THE INVENTION

Accordingly, an objective of the present invention is to provide a cleaning system (and method of using the same) that provides sufficient filtering capabilities in an associated collection tank. Another objective of the present invention is to provide a cleaning system (and method of using the same) that reduces the potential for dirt and/or lint buildup along a bottom of an associated collection tank. Yet another objective is to provide a cleaning system that promotes effective removal of debris, soil, and/or lint from the associated collection tank. These objectives, as well as others, are addressed by the present invention, which provides a cleaning system having a novel collection tank design.

In a first aspect, the present invention is embodied in a cleaning system having a housing, a fluid supply tank that is interconnectable with the housing, and a fluid applicator that is interconnectable with the fluid supply tank. In addition, this first aspect includes a collection tank that is interconnectable with the housing, and a waste collection device that is interconnectable with the collection tank. This collection tank associated with the first aspect has a top end and an opposing bottom end. Moreover, the collection tank tapers toward the bottom end.

Various refinements exist of the features noted in relation to the subject first aspect of the present invention. Further features may also be incorporated in the subject first aspect of the present invention as well. These refinements and additional features may exist individually or in any combination. For instance, the collection tank may have first and second side walls. In one embodiment, these first and second side walls may be substantially parallel with one another. In another embodiment, the first side wall may be characterized as being larger (e.g., having a larger surface area on an interior of the collection tank) than the second side wall. In embodiments having at least first and second side walls, the collection tank preferably tapers from the first side wall toward the second side wall. Herein, "taper" or the like at least generally refers to becoming progressively smaller, or to a narrowing.

In one characterization, the collection tank associated with the first aspect of the present invention may be said to include a sloped (e.g., slanted, curved and/or angled) wall that interconnects the second side wall of the collection tank with a bottom wall of the bottom end of the collection tank. In one light, this sloped wall may be said to be oriented at a generally obtuse interior angle relative to the bottom wall. For example, this sloped wall may be oriented at an interior angle of between about 120 degrees and about 160 degrees relative to the bottom wall in one embodiment, between about 130 degrees and about 150 degrees relative to the bottom wall in another embodiment, and about between about 135 degrees and about 145 degrees in yet another embodiment. With regard to the second side wall of the collection tank, the sloped wall may be oriented at an interior angle of between about 100 degrees and about 170 degrees in one embodiment, between about 110 degrees and 150 degrees in yet another embodiment, and between about 120 degrees and 130 degrees in yet another embodiment. Relative to the first side wall of the collection tank, the sloped wall may be oriented at an interior angle of between about 20 degrees and about 80 degrees in one embodiment, between about 35 degrees and about 70 degrees in another embodiment, and between about 50 degrees and about 60 degrees in yet another embodiment. Herein, an "interior angle" or the like generally refers to an angle formed by a meeting of two walls (or imaginary lines extending therefrom) that is inside (or that is at least disposed toward or that opens toward) the collection tank.

In the case of the fluid supply tank associated with the first aspect of the present invention, a portion of the collection tank may be disposed at least generally atop a portion of the fluid supply tank. So, using a Cartesian coordinate system as an example, at least one X-value, at least a portion of the collection tank may have a greater Y-value than a corresponding portion of the fluid supply tank at that particular X-value. Moreover, a portion of the collection tank may be said to be disposed at least generally beside a portion of the fluid supply tank. So, and again using a Cartesian coordinate system as an example, at least one Y-value, at least a portion of the collection tank may have a greater or smaller X-value than a corresponding portion of the fluid supply tank at that particular Y-value.

Still referring to the first aspect of the invention, the fluid supply tank may, at least in one embodiment, be characterized as having both a lower wall and an upper wall. In such embodiments, the upper wall of the fluid supply tank may be said to interconnect with the lower wall at an acute (e.g., less than 90 degrees) interior angle. Moreover, at least in one embodiment, the fluid supply tank may taper toward a juncture (e.g., junction or place of meeting) of the upper and lower walls. The fluid supply tank may be characterized as having a first side and an opposing second side. In at least one of these embodiments, the fluid supply tank may be said to taper from the first side toward the second side.

A second aspect of the present invention is directed to a cleaning system including a motor vehicle, a fluid supply tank that is interconnectable with the motor vehicle, and a fluid applicator that is interconnectable with the fluid supply tank. Moreover, this cleaning system of the second aspect has a collection tank that is interconnectable with the motor vehicle, and a waste collection device that is interconnectable with the collection tank. This collection tank associated with the second aspect includes a release valve, and the collection tank tapers toward the release valve.

Various refinements exist of the features noted in relation to the subject second aspect of the present invention. Further features may also be incorporated in the subject second aspect of the present invention as well. These refinements and additional features may exist individually or in any combination. For instance, the collection tank and the fluid supply tank may share a common wall. So, for example, cleaning fluid may be found on one side of this common wall, and collected waste fluid may be found on another side of this common wall. In one preferred embodiment, this common wall may be sloped, such as that described above in relation to the first aspect of the invention. In addition or alternatively, a wall of the collection tank may physically contact a wall of the fluid supply tank. That is walls of the respective collection and fluid supply tanks may touch or interface with one another. In one embodiment, the fluid supply tank and the collection tank may be positioned together, and the resulting assembly is substantially box-shaped. While one or both of the liquid supply tank and the collection tank may simply be placed in or on the motor vehicle (e.g., to transport the same), one or both of the liquid supply tank and the waste collection tank is preferably mounted to (e.g., at least temporarily fastened or attached to) the motor vehicle. As still another refinement, the fluid supply tank associated with the second aspect of present invention may taper toward a filling port of the fluid supply tank.

Yet a third aspect of the present invention is embodied in a cleaning system equipped with a dispensing mechanism for dispensing cleaning fluid, and a collection mechanism for collecting at least a portion of the cleaning fluid dispensed by the dispensing mechanism. This collection mechanism associated with the third aspect includes a collection tank that tapers toward a release valve that is found toward a bottom of the collection tank.

Various refinements exist of the features noted in relation to the subject third aspect of the present invention. Further features may also be incorporated in the subject third aspect as well. These refinements and additional features may exist individually or in any combination. As an example, the dispensing mechanism may includes a supply tank that tapers toward a filling port that is preferably found toward a top of the supply tank.

One or more of the various features discussed herein in relation to one or more of the described aspects of the present invention may be utilized by any other appropriate aspect(s) of the present invention as well, alone or in any combination. In addition, various other refinements may also be incorporated into one or more of the aspects of the invention. For instance, the cleaning system may includes one or more hoses. So, one embodiment may include a first hose in which cleaning fluid may be conveyed, and a second hose in which waste fluid (including, dust, soil, and other undesired materials that may be found on/in carpet, upholstery, or other object to be cleaned) may be conveyed. A hand-held wand (or other appropriate tool or attachment) may be utilized to both dispense clean fluid and to collect waste fluid. Other embodiments may have separate and distinct attachments for dispensing clean fluid and to collect waste fluid. Other refining features may include a heat exchanger for heating the cleaning fluid in or from the liquid supply tank, and/or at least one baffle positioned in one or both the collection tank and the liquid supply tank.

DETAILED DESCRIPTION

Figure 2:
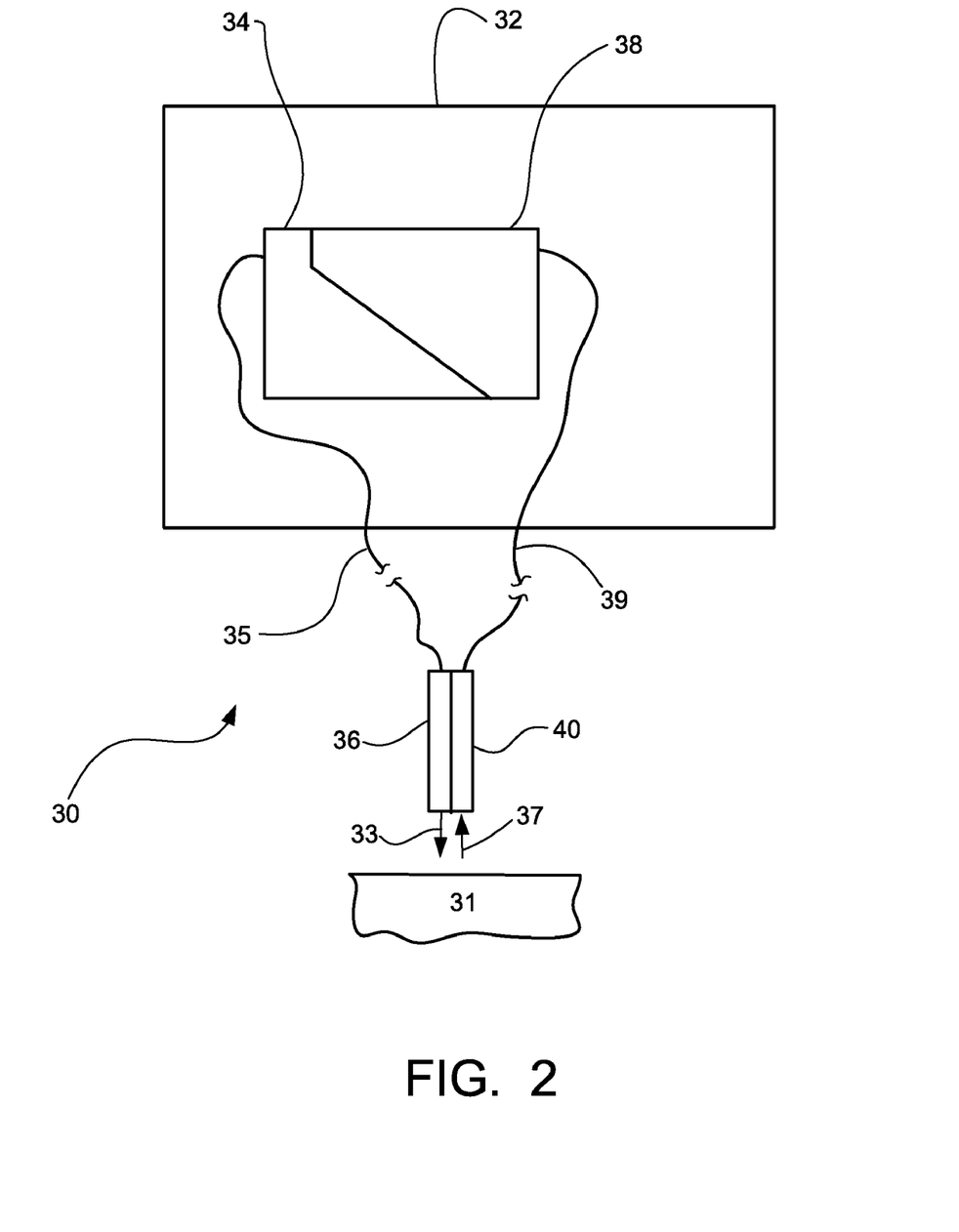
FIG. 2 is a schematic view of one embodiment of a cleaning system.

The present invention will now be described in relation to the accompanying drawings, which at least assist in illustrating the various pertinent features thereof. FIG. 2 diagrammatically illustrates a cleaning system 30 that includes a housing 32 (e.g., a transportable receptacle, wheeled trailer, or a motor vehicle such as an automobile, van or truck), a fluid supply tank 34 positioned at least generally within the housing 32, and a fluid applicator 36 that is operably interconnected with the fluid supply tank 34. Herein, "interconnected," "interconnectable," or the like generally refers to something being (or capable of being) either directly or indirectly connected (or caused to be connected) with something else. In any event, the cleaning system 30 also has a collection tank 38 that is positioned at least generally within the housing 32 and that interconnected with the housing 32, and a waste collection device 40 that is operably interconnected with the collection tank 38.

As a general overview of how the cleaning system 30 functions, one or more appropriate cleaning fluids (e.g., water, solvents, cleaning liquids, powders, dispersions, and/or the like) are initially disposed in the fluid supply tank 34. Cleaning fluid is generally transported from the fluid supply tank 34 through an appropriate conduit 35 toward the fluid applicator 36 from which the cleaning fluid is ejected (e.g., in a direction 33 toward a carpet or upholstery 31). Accordingly, the fluid supply tank 34, the conduit 35, and the fluid applicator 36, in combination, may be characterized as a fluid dispensing portion of the cleaning system 30. The cleaning fluid (as well as any debris, soil, or the like) is preferably extracted from the carpet/upholstery 31 (e.g., in a direction 37) and transported through the waste collection device 40 to the collection tank 38 via an appropriate conduit 39. This waste cleaning fluid is generally collected and/or stored in the collection tank 38 until it is desired to dispose of the waste cleaning fluid. Thus, the waste collection device 40, the conduit 39, and the collection tank 38, in combination, may be referred to as a collecting portion of the cleaning system 30 that at least generally is utilized to collect or return the fluid dispensed by the dispensing portion of the cleaning system 30. It should be noted that FIG. 2 is not to scale and should therefore, in and of itself, not be construed to be structurally (e.g., relative size, orientation, and/or shape) limiting.

Figure 3:
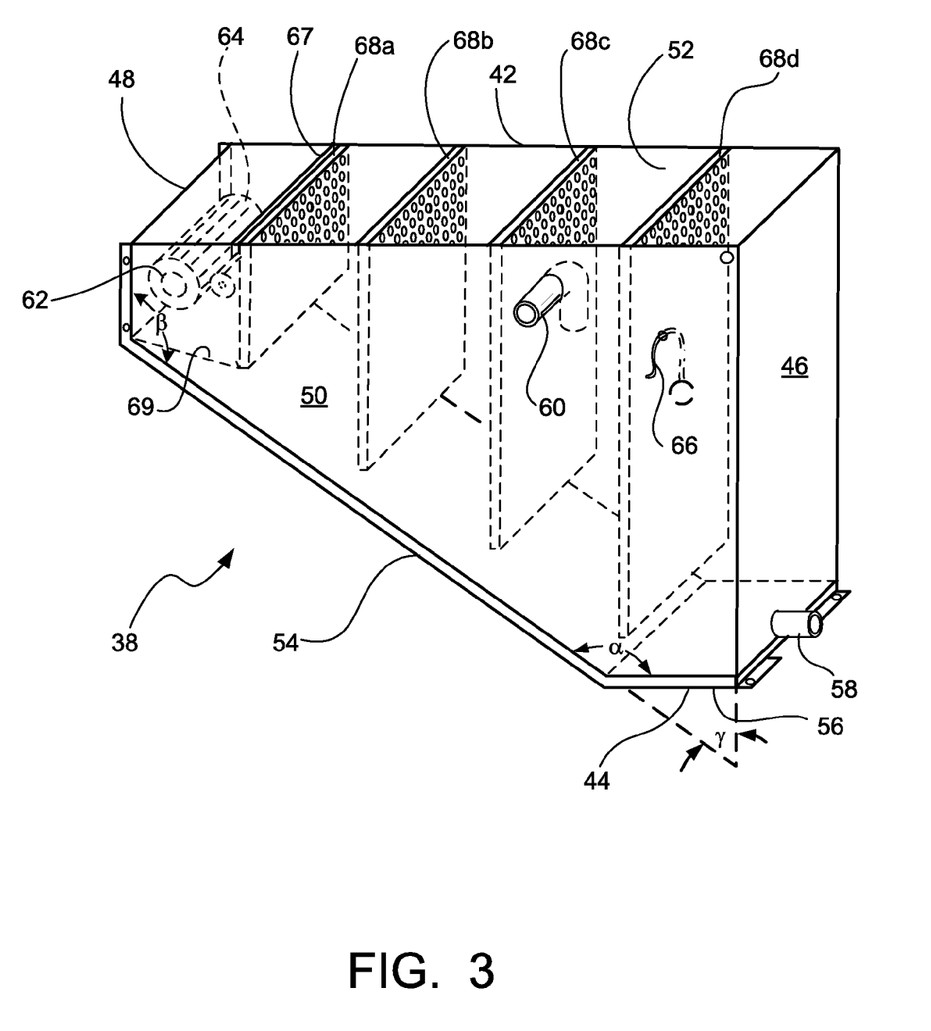
FIG. 3 is a perspective view of a collection tank for a cleaning system.

Referring to FIG. 3, the collection tank 38 may be characterized as having a top end 42 and an opposing bottom end 44. In addition, the collection tank 38 has first, second, third, and fourth side walls 46, 48, 50, 52, respectively. The first and second side walls 46, 48 are illustrated as being substantially parallel with one another. Likewise, the third and fourth side walls 50, 52 are illustrated as being substantially parallel with one another. Further, while the third and fourth side walls 50, 52 are substantially the same size, the first side wall 46 is substantially larger than the second side wall 48. In other words, the first side wall 46 generally has a greater surface area than the second side wall 48.

Still referring to FIG. 3, the collection tank 38 also has a sloped (e.g., slanted, curved and/or angled) wall 54 that interconnects the second side wall 48 of the collection tank 38 with a bottom wall 56 associated with the bottom end 44 of the collection tank 38. This sloped wall 54 is oriented at a generally obtuse interior angle "α" relative to the bottom wall 56 that is preferably between about 120 degrees and about 160 degrees, more preferably between about 130 degrees and about 150 degrees, and even more preferably between about 135 degrees and about 145 degrees. Further, this sloped wall 54 is shown as being oriented at a generally obtuse interior angle "β" relative to the second side wall 48 that is preferably between about 100 degrees and about 170 degrees, more preferably between about 110 degrees and about 150 degrees, and even more preferably between about 120 degrees and about 130 degrees. Even further, this sloped wall 54 is oriented at a generally acute interior angle "γ" that is preferably between about 20 degrees and about 80 degrees, more preferably between about 35 degrees and about 70 degrees, and even more preferably between about 50 degrees and about 60 degrees. With regard to the above-described angles "α," "β," and "γ," it should be noted that other interior angles outside of the disclosed ranges may be appropriate without departing from the nature of the invention. Due to the manner in which this sloped wall 54 relates other portions of the collection tank 38 of FIG. 3, the collection tank 38 may be characterized as tapering at least generally from the first side wall 46 toward the second side wall 48, and at least generally from the top end 42 toward the bottom end 44 of the collection tank 38.

In addition to the various walls, the collection tank 38 includes a release valve 58 that is positioned near the bottom end 44 of the collection tank 38. More particularly, this release valve 58 is associated with the first side wall 46 adjacent the bottom wall 56 of the collection tank 38. Since the release valve 58 is generally utilized (at least when open) to allow the various fluid and materials disposed within the collection tank 38 to escape, it is generally preferred that the release valve be positioned near the bottom end 44 of the collection tank 38. Moreover, it is generally preferred that the walls (e.g., 54) of the collection tank 38 are configured to at least generally enable the tank 38 to taper toward the release valve 58.

Still referring to FIG. 3, the collection tank 38 is equipped with a waste fluid inlet 60 (at least generally toward the top end 42 of the tank 38) that is generally interconnected with the conduit 39 to allow collected waste fluid to enter the collection tank 38. Further, the tank 38 has an vacuum port 62 to which an appropriate vacuum source (not shown) is interconnected to at least generally provide a suction force. An appropriate filter 64 (e.g., a porous synthetic material) is generally associated with this vacuum port 62 to at least generally prevent or hinder exposure of the vacuum source (not shown) to debris, lint, soil, and the like. Yet further, the collection tank 38 is equipped with an automatic shutdown feature 66 that generates a signal to shutdown the vacuum source when/if a threshold level of collected waste fluid is detected.

Still further, a plurality of baffles 68 are associated with the collection tank 38 of FIG. 3. More particularly, four baffles 68*a*–*d* of various sizes are illustrated that are generally positioned so as to avoid direct contact with the sloped wall 54 of the tank 38. For example, these baffles 68*a*–*d* may each be spaced from the sloped wall 54 by at least 0.5 inch or more. While these baffles 68*a*–*d* are illustrated as being at least generally parallel with the first and second side walls 46, 48, other embodiments exist in which at least one of the baffles is not substantially parallel to one or both the first and second side walls 46, 48. These baffles 68*a*–*d* may serve a number of functions such as a filtering function to prevent/hinder debris, soil, lint, and the like from reaching the vacuum port 62, or the filter associated therewith, thus reducing a number of filter cleaning events associated with operation of the cleaning system 30 (FIG. 2). Accordingly, it is generally preferred that these baffles 68*a*–*d* include a plurality of apertures designed/configured to promote this filtering feature. It will be appreciated that other numbers, orientation, and/or sizes of baffles may be appropriate for use with the collection tank 38.

Associated with the baffle 68*a*, is a replaceable filter 67 that is preferably positioned in close proximity to (and in some embodiments, even against) the baffle 68*a*. This filter 67 may be held in position in a variety of appropriate manners, such as through the use of a wire mesh that is interconnected with the tank 38. Moreover, this filter 67 may be made of any appropriate filter material such as, for example, fiber glass. It should also be noted that a floor element 69 is associated with the tank to at least generally prevent waste fluids from coming into contact with the filter 64 except via travel through the baffle 68a and the filter 67. This tends to at least generally reduce the likelihood of clogging the vacuum port 62.

As a benefit of utilizing the collection tank 38 equipped with the sloped wall 54, "recovered" or collected waste fluid entering the collection tank 38 via the waste fluid inlet 60 is generally agitated and/or causes agitation of waste fluid already disposed within the tank 38. Due to the design of the sloped wall 54, this agitation generally deters sediment (e.g., lint, soil, debris) from collecting on the sloped wall 54. In other words, the sloped wall 54, alone or in combination with the agitation provided by the inflowing waste fluid, at least generally promotes movement of sediment toward the bottom end 44, and more particularly, the release port 58 of the collection tank 38. Moreover, when the release port 58 is opened, the action of the waste fluid along sloped wall 54 toward the release port 58 promotes egress (via the release port 58) of any sediment that may have deposited on one or both the sloped and bottom walls 54, 56. Accordingly, employment of the collection tank 38 in the cleaning system 30 at least generally promotes effective removal of sediment from the collection tank 38. In other words, use of the collection tank 38 at least generally reduces a need for cleaning the collection tank 38.

Figure 4:
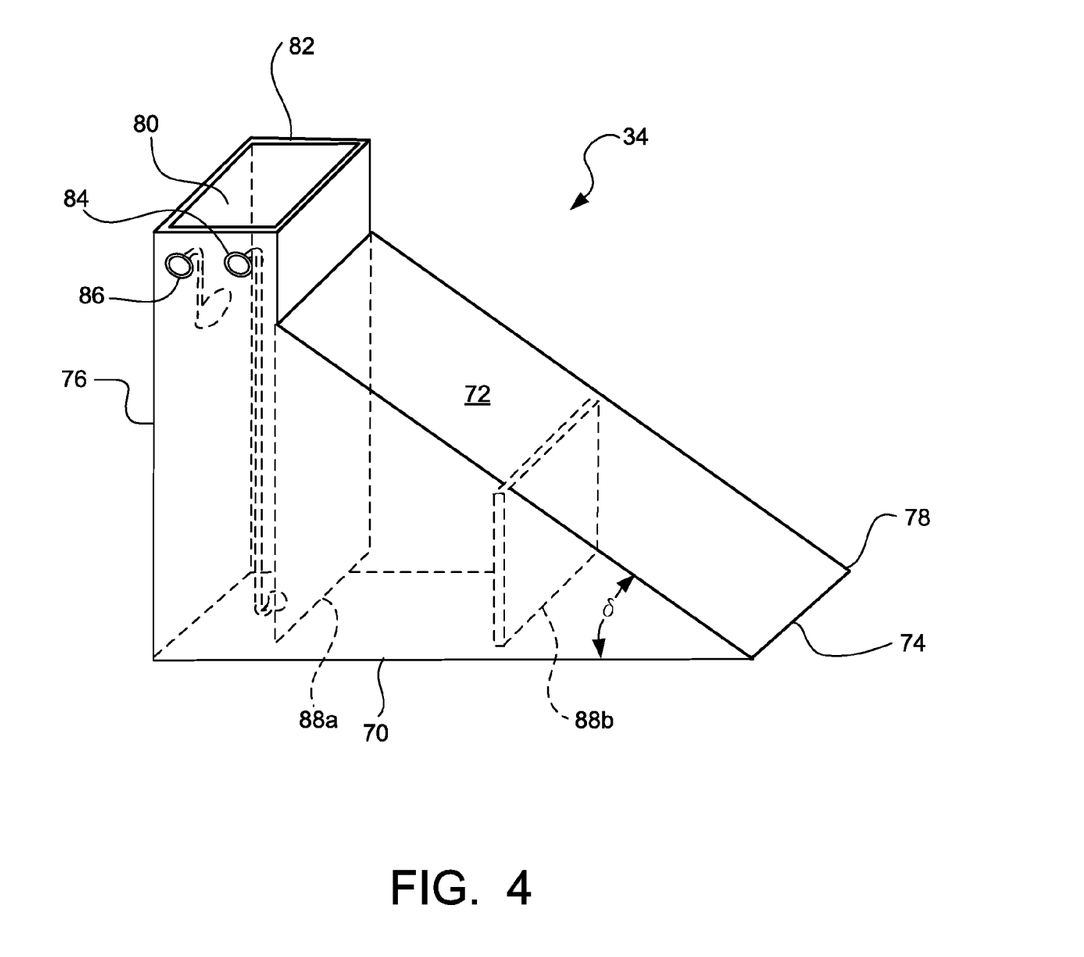
FIG. 4 is a perspective view of a fluid supply tank for a cleaning system.

Referring to FIG. 4, the fluid supply tank 34 of the cleaning system 30 has a lower wall 70 and an upper wall 72 that interconnects with the lower wall 70 at an acute (e.g., less than 90 degrees) interior angle "δ." This interior angle "δ" may be any appropriate angle, but is preferably complimentary with the interior angle "α" associated with the collection tank 38 of FIG. 3. In other words, the sum of the angles "δ" and "α" is preferably about 180 degrees. In any event, due to the relative orientation of the lower and upper walls 70, 72 of the fluid supply tank 34, it may be said that the fluid supply tank 34 at least generally tapers toward a juncture 74 of the lower and upper walls 70, 72. In another characterization, the fluid supply tank 34 may be said to taper from a first side 76 of the tank 34 toward an opposing second side 78.

Still referring to the fluid supply tank 34, a filling port 80 is disposed toward a top 82 of the tank 34. This filling port is generally designed configured to allow cleaning fluid(s) to be disposed in the supply tank 34. Due to the general positioning of the filling port 80, it may be said that the fluid supply tank 34 tapers at least generally from the lower wall 70 toward the filling port 80.

FIG. 4 also illustrates that the fluid supply tank 34 includes a water outlet 84 to which the conduit 35 (FIG. 2) generally interconnects, and a filling shut-off feature (and optional fluid filling inlet) 86 to warn a user of a fluid level approaching the top 82 of the tank 34, or to generate a signal which causes a cessation of disposing cleaning fluid into the tank 34. Further, the fluid supply tank 34 may be equipped with at least one baffle 88. Here, the tank 34 has first and second baffles 88a, 88b which are generally positioned so that they do not directly contact the lower wall 70 of the tank 34. For example, these baffles 88a, 88b may be spaced from the lower wall 70 by at least 0.5 inch or more. Moreover, these baffles 88a, 88b may be spaced from the upper wall 72 as well. These baffles 88a, 88b may serve a number of functions such as an "anti-sloshing" function. Accordingly, it is generally preferred that these baffles 88a, 88b include a plurality of apertures. While only two baffles 88a, 88b are associated with the tank 34, it will be appreciated that other numbers and/or sizes of baffles may be appropriate.

Figure 5:
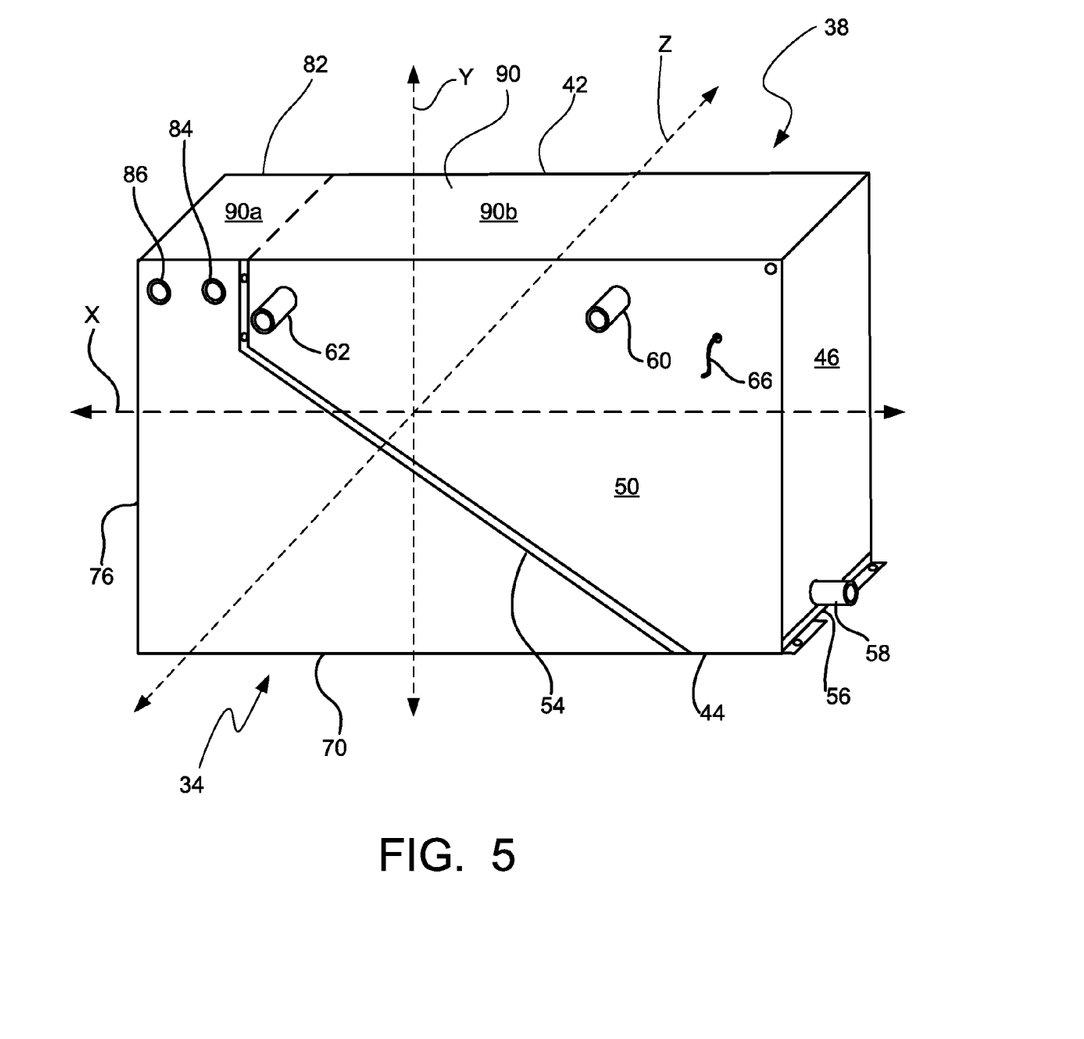
FIGS. 5–6 are perspective views of an assembly including the collection tank of FIG. 3 and the fluid supply tank of FIG. 4.
Figure 6:
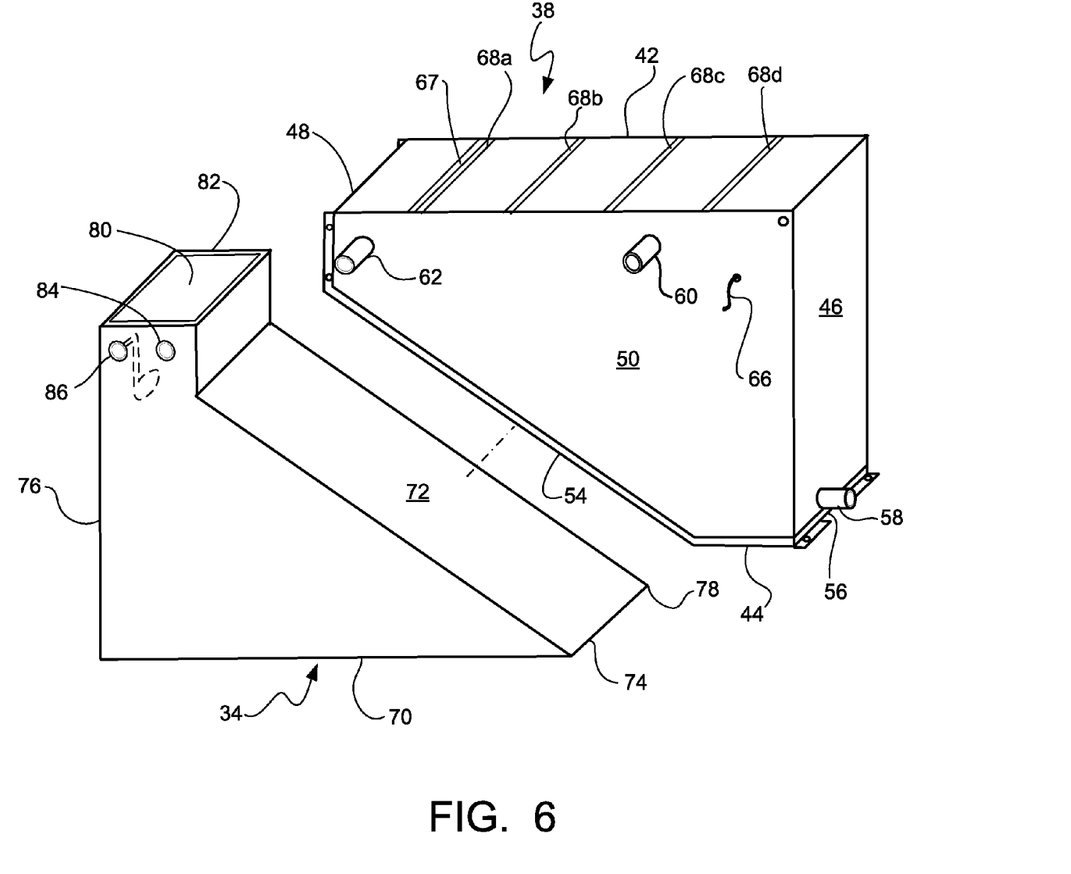

Referring to FIGS. 5–6, the fluid supply tank 34 is preferably complimentarily configured to accommodate and/or at least partially support the collection tank 38. More particularly, the fluid supply tank 34 and the collection tank 38 may be positioned such that the upper wall 72 of the fluid supply tank 34 physically contacts (or directly interfaces with) the sloped wall 54 of the collection tank 38. In this regard, it may be said that the two tanks 34, 38 share at least one common wall. Accordingly, cleaning fluid may be found on fluid supply tank 34-side of this common wall, and collected waste fluid may be found on a collection tank 38-side of this common wall. Moreover, the fluid supply tank 34 and the collection tank 38, in combination, at least generally resemble a box-shaped structure. Referring to FIG. 5, at least a portion of the collection tank 38 is at least generally positioned atop a portion of the fluid supply tank 34. Using a Cartesian coordinate system, at at least one X-value, at least a portion of the collection tank 38 has a greater Y-value than a corresponding portion of the fluid supply tank 34 at that particular X-value. Moreover, a portion of the collection tank 38 is at least generally disposed beside a portion of the fluid supply tank 34. In this light, at least one Y-value, a portion of the collection tank 38 has a greater or smaller X-value than a corresponding portion of the fluid supply tank 34 at that particular Y-value. Using this Cartesian coordinate system to further describe the collection tank 38, the collection tank 38 may be characterized as having a pentagonal cross-sectional perimeter taken along an XY-plane.

FIG. 5 also illustrates that an appropriate cover assembly 90 may be associated with each of the fluid supply tank 34 and the collection tank 38. More particularly, a first cover 90a may be positioned on the top 82 of the fluid supply tank 34 (e.g., to effectively occlude the filling port 80). Moreover, a second cover 90b may be positioned on the top end 42 of the collection tank 38. These covers 90a, 90b may be integral so as to for the single cover assembly 90, or these covers may be separate and distinct components of the cleaning system 30. Further, one or both of the cover(s) 90 may or may not be removable from the associated tanks 34, 38. In other words, one or both the covers 90a, 90b may be integral with the respective tanks 34, 38. With regard to the covers 90a–b, a number of appropriate manners of interconnecting the same with the respective tanks 34, 38 exist including, but not limited to, welds, adhesives, mechanical fasteners, seals, pressure-locking devices, and the like.

Those skilled in the art will now see that certain modifications can be made to the system and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A cleaning system, comprising:
   a motor vehicle;
   a fluid supply tank interconnectable with said motor vehicle;
   a fluid applicator interconnectable with said fluid supply tank;
   a collection tank interconnectable with said motor vehicle, wherein said collection tank includes a release valve;

an upper wall;

a pair of side walls extending down from opposing edge portions of said upper wall;

a sloped bottom wall extending between the bottom edge portions of said side walls;

and a plurality of baffles inside said collection tank, said baffles extending from the upper wall toward, but not reaching, said sloped wall and each baffle being interconnected along its length to the inner surface of said side walls, wherein said collection tank tapers toward said release valve; and a waste collection device interconnectable with said collection tank.

2. A cleaning system, as claimed in claim 1, wherein:
said fluid supply tank tapers toward a filling port of said fluid supply tank.

3. A cleaning system, as claimed in claim 1, wherein:
said collection tank and said fluid supply tank share a common wall.

4. A cleaning system, as claimed in claim 1, wherein:
a wall of said collection tank physically contacts a wall of said fluid supply tank.

5. A cleaning system, as claimed in claim 1, wherein:
an assembly consisting of said fluid supply tank and said collection tank is substantially box-shaped.

6. A cleaning system, as claimed in claim 1, wherein:
said at least one of said fluid supply tank and said waste collection tank is mounted to said motor vehicle.

7. A cleaning system comprising:

a housing;

a fluid supply tank interconnectable with said housing;

a fluid applicator interconnectable with said fluid supply tank;

a collection tank interconnectable with said housing, said collection tank comprising an upper wall, an opposing bottom wall that is substantially parallel to said upper wall wherein said upper wall is longer than said bottom wall, a first side wall interconnected to a first end of said upper wall and to a first end of said bottom wall, said first side wall being substantially perpendicular to both said upper wall and said bottom wall, a second side wall that is substantially parallel to said first side wall wherein said first side wall is longer than said second side wall, said second side wall being interconnected to a second end of said upper wall, and a sloped wall that extends from the end of said second side wall opposite said upper wall to the end of said bottom wall opposite said first side wall;

a third side wall interconnected on its perimeter to a first edge of said top wall, said first side wall, said bottom wall, said sloped wall, and said second side wall;

a fourth side wall opposite said third side wall, said fourth side wall being interconnected on its perimeter to a second edge of said top wall, said first side wall, said bottom wall, said sloped wall, and said second side wall; and a plurality of baffles within said collection tank wherein each of said plurality of baffles extends from the inside surface of said top wall toward, but not reaching, said sloped wall and each baffle is interconnected along its length to the inner surface of said third side wall and the inner surface of said fourth side wall; and a waste collection device interconnectable with said collection tank.

8. A cleaning system, as claimed in claim 7, wherein:
said sloped wall is oriented at an interior angle of between about 120 degrees and about 160 degrees relative to said bottom wall.

9. A cleaning system, as claimed in claim 7, wherein:
said sloped wall is oriented at an interior angle of between about 100 degrees and about 170 degrees relative to said second side wall of said collection tank.

10. A cleaning system, as claimed in claim 7, wherein:
said sloped wall is oriented at an interior angle of between about 20 degrees and about 80 degrees relative to said first side wall of said collection tank.

11. A cleaning system, as claimed in claim 7, wherein:
a portion of said collection tank is disposed at least generally atop a portion of said fluid supply tank.

12. A cleaning system, as claimed in claim 11, wherein:
a portion of said collection tank is disposed at least generally beside a portion of said fluid supply tank.

13. A cleaning system, as claimed in claim 7, wherein:
said fluid supply tank comprises a lower wall and an upper wall, wherein said upper wall of said fluid supply tank interconnects with said lower wall at an acute interior angle.

14. A cleaning system, as claimed in claim 13, wherein:
said fluid supply tank tapers toward a juncture of said upper and lower walls.

15. A cleaning system, as claimed in claim 7, wherein:
said fluid supply tank comprises first side and an opposing second side, wherein said fluid supply tank tapers from said first side toward said second side.

* * * * *